United States Patent
Oswald et al.

(10) Patent No.: US 10,399,826 B2
(45) Date of Patent: Sep. 3, 2019

(54) SUSPENSION RING FOR MULTISTRAND LIFTING TACKLE

(71) Applicant: pewag austria GmbH, Kapfenberg (AT)

(72) Inventors: Bernhard Oswald, Kapfenberg (AT); Christian Kohlhuber, Aflenz Kurort (AT)

(73) Assignee: pewag austria GmbH, Kapfenberg (AT)

( * ) Notice: Subject to any disclaimer, the term of this patent is extended or adjusted under 35 U.S.C. 154(b) by 0 days.

(21) Appl. No.: 15/955,601

(22) Filed: Apr. 17, 2018

(65) Prior Publication Data
US 2018/0305185 A1    Oct. 25, 2018

(30) Foreign Application Priority Data
Apr. 21, 2017    (EP) .................................... 17167600

(51) Int. Cl.
*B66C 1/12*    (2006.01)
*F16G 13/12*    (2006.01)
(Continued)

(52) U.S. Cl.
CPC .............. *B66C 1/125* (2013.01); *F16G 13/12* (2013.01); *F16G 15/02* (2013.01); *F16G 15/12* (2013.01)

(58) Field of Classification Search
CPC .. B66C 1/12; B66C 1/125; B66C 1/14; B66C 1/40; B66C 15/00; F16G 13/12; F16G 15/00; F16G 15/04; F16G 15/12
(Continued)

(56) References Cited

U.S. PATENT DOCUMENTS 1,126,282 A * 1/1915 Riley ........................ B66C 1/00
                                                        294/215
4,270,907 A    6/1981 Rodriguez-Perazza
(Continued)

FOREIGN PATENT DOCUMENTS

DE          38 00 685 C1    3/1989
EM          0 331 069 A1    9/1989
(Continued)

OTHER PUBLICATIONS

Anderson-Images.com: "Lightweight Paragliding Carabiner: AustriAlpin Stratus", You Tube, http://www.youtube.com/watch?v=NRd1llopV78 (May 27, 2014).

*Primary Examiner* — Dean J Kramer
(74) *Attorney, Agent, or Firm* — Christensen, Fonder, Dardi & Herbert PLLC

(57) ABSTRACT

A suspension ring for multistrand lifting tackle comprises two parallel rectilinear legs connected to one another at their ends by arcuate connecting legs. A lower connecting leg is along a longitudinal center line of the ring, extending as a circular segment in the central region of its extent and in the two regions in which it merges into each of the two legs. The radii of the rounded portions on the inside of the ring are less than half the internal width of the ring but greater than half the diameter of the legs, and the central region in the form of a circular segment is connected at its ends to the transitional region as a circular segment to the adjacent leg via a rectilinear intermediate segment of the connecting leg. An angle of the intermediate segment ranges from 50° to 75° to the longitudinal center line of the ring.

6 Claims, 3 Drawing Sheets

(51) Int. Cl.
*F16G 15/12* (2006.01)
*F16G 15/02* (2006.01)

(58) Field of Classification Search
USPC .................................. 294/74, 82.1, 82.11
See application file for complete search history.

(56) References Cited

U.S. PATENT DOCUMENTS

| | | | | |
|---|---|---|---|---|
| 5,193,480 | A * | 3/1993 | Garrett | B66C 1/12 |
| | | | | 116/200 |
| 5,601,326 | A * | 2/1997 | Smetz | B66C 1/14 |
| | | | | 116/200 |
| 5,683,131 | A * | 11/1997 | Lucas | B66C 1/18 |
| | | | | 294/74 |
| 6,648,388 | B2 * | 11/2003 | Fredriksson | B66C 1/12 |
| | | | | 294/74 |
| 6,925,794 | B2 | 8/2005 | Dalferth et al. | |
| 7,032,372 | B1 | 4/2006 | Horvath | |
| 7,107,754 | B2 | 9/2006 | Sinz et al. | |
| 7,228,600 | B1 | 6/2007 | Selby et al. | |
| 7,231,759 | B2 | 6/2007 | Benecke | |
| D661,862 | S | 6/2012 | Gustafsson | |
| 2005/0193532 | A1 | 9/2005 | Chang | |
| 2008/0315604 | A1 | 12/2008 | Fredriksson | |

FOREIGN PATENT DOCUMENTS

| | | |
|---|---|---|
| EM | 000235064-0001 | 9/2004 |
| EM | 000235064-0002 | 9/2004 |
| EM | 001778853-0001 | 11/2010 |
| EM | 001778853-0002 | 11/2010 |
| EM | 001778853-0003 | 11/2010 |

* cited by examiner

PRIOR ART

SUSPENSION RING FOR MULTISTRAND LIFTING TACKLE

PRIORITY CLAIM

The present application claims priority to European Patent Application No. 17 167 600.0, filed on Apr. 21, 2017, which said application is incorporated by reference in its entirety herein.

FIELD OF THE INVENTION

The invention relates to a suspension ring for multistrand lifting tackle which comprises two parallel rectilinear legs, which are connected to one another at the respective ends thereof by arcuate connecting legs, wherein the lower connecting leg is formed symmetrically with respect to the longitudinal center line of the suspension ring and extends in a rounded shape in the form of a circular segment in the central region of its extent and in the two regions in which it merges into each of the two legs.

BACKGROUND OF THE INVENTION

A suspension ring is known from US 2008/0315604 A1, in which the two parallel rectilinear legs are connected to one another by semicircular arcs as connecting legs. In this case, the chain strands adopt a position in this rounded portion of the connecting leg corresponding to the slope angle at the circumference of 0° to 60°. In this case, it is only with relative difficulty that the user can determine the slope angle in order to correctly estimate the load bearing capacity of a set of lifting tackle.

In the case of the suspension ring for multistrand lifting tackle of the kind shown in U.S. D661,862 S, the connecting legs are no longer of semicircular design but are provided with a larger rounding radius, thereby achieving better adaptation to the relatively flat crane hook and resulting in more extensive adaptation between the rounded portion of the connecting leg and the crane hook, thereby making it possible to reduce the wear on the hook and the ring. However, the difficulty of determining the slope angle and of estimating the load bearing capacity of a set of lifting tackle is not improved here.

In the case of multistrand lifting tackle, the load bearing capacity is specified as a function of the angle of the strands relative to an imaginary vertical or horizontal line or as a function of the angle which the strands enclose with one another. In the context of the present description, reference is in all cases to the angle which the strands enclose relative to an imaginary vertical line and which is referred to for short as the "slope angle". Fundamentally, the load bearing capacity of a set of lifting tackle consists of the load bearing capacities of the individual chain strands as a function of the slope angle. Here, slope angles can be 0° to 60°. Slope angles greater than 60° are fundamentally not permitted. At the same time, it is relatively difficult for the user to determine the slope angle accurately or with some accuracy and hence to correctly estimate the load bearing capacity of a set of lifting tackle.

For general lifting operations, the standard angular range of 0° to 60° is divided into two ranges, which are assigned the lowest possible load bearing capacity of the respective range. Thus, for example, the angular range 0° to 45° is assigned the load bearing capacity of 45° and the angular range 45° to 60° is assigned the load bearing capacity of 60°. However, even with these subdivisions, it is not easy for the user to determine the slope angle range with a good degree of certainty.

SUMMARY OF THE INVENTION

Based on the above, the invention aims to propose a suspension ring for multistrand lifting tackle in which the load bearing capacity of the tackle as a function of the slope angle is easier to determine for the user.

According to the invention, this is achieved, in the case of a suspension ring of the type stated at the outset, by virtue of the fact that the rounded portions on the inside of the suspension ring are less than half the internal width of the suspension ring but greater than half the diameter of the legs, and that the central region, in the form of a circular segment, of the connecting leg is connected at each of its ends to the transition in the form of a circular segment to the adjacent leg via a rectilinear intermediate segment of the connecting leg, which intermediate segment is at an angle in a range of from 50° to 75° to the longitudinal center line of the suspension ring.

Whereas, in the case of suspension rings in accordance with the prior art, the chain strands position themselves in the rounded portion of the connecting legs in accordance with the slope angle at the circumference of 0° to 60°, the invention offers the advantage here over the prior art that the position of the chain strands in the suspension ring is limited essentially to two regions which can be distinguished more easily and well by sight and to each of which a load bearing capacity can be assigned. If the strands are situated in or close to the central region of the connecting leg, the load bearing capacity corresponds to the range of 0° to 45°. If, on the other hand, the strands are situated further out, namely in the region of the transition to the two legs, the load bearing capacity corresponds to the range of 45° to 60°. This is achieved by virtue of the fact that the rectilinear intermediate segments used according to the invention on each connecting leg spatially separate the slope angle ranges 0° to 45° and 45° to 60° by means of their angular position. In this case, the angles of incidence of the straight segments of the suspension ring are chosen in such a way that the chain or cable strand changes over under load to one of the two angular ranges indicated and positions itself there in each case.

By virtue of the design according to the invention of the suspension ring, there is also good contact between the crane hook and the suspension ring at the upper connecting leg, wherein an advantageous design consists in that the upper connecting leg, which is connected to the crane hook, is specifically adapted to the latter.

In a particularly advantageous embodiment of the suspension ring according to the invention, the radius of the rounded portion in the central region of the connecting leg of said ring is 2.5 times greater than half the diameter of the legs of the suspension ring, thereby making it possible to identify the slope angle range of the respective stranded lifting tackle quickly and well from the position of the hooked-in B links.

Equally, however, it can also be advantageous to make the radii of the rounded portions in the form of circular segments in the central region of the connecting leg and in the regions of the transitions thereof to the legs of the suspension ring equal.

In the invention, the rounded regions of the lower connecting leg, into which the multistrand lifting tackle is hooked, each preferably merge tangentially into an adjoining rectilinear segment. In the case of pivoting movements of the multistrand lifting tackle hooked in, it is thereby possible to achieve jolt-free transitions between the respectively adjacent regions of the connecting leg.

A very particularly favorable embodiment of the invention is also achieved if each rectilinear intermediate segment of the lower connecting leg slopes at an angle of incidence 60° to the longitudinal center line of the suspension ring, thereby likewise making it possible to achieve very good recognizability of the slope angle range of the position of the hooked-in B links of a multistrand lifting tackle by the user.

It is furthermore also of particular advantage in the suspension ring according to the invention if the arcuate connecting leg is additionally chamfered over its entire length, thereby making it possible to achieve a particularly accurate implementation of the transition between the circular segments and the straight segments of the connecting leg and hence very accurate implementation of the position of the mounted strands.

BRIEF DESCRIPTION OF THE DRAWINGS

The invention is explained in greater detail below in principle by way of example with reference to the figures, of which.

DETAILED DESCRIPTION

Figure 1:
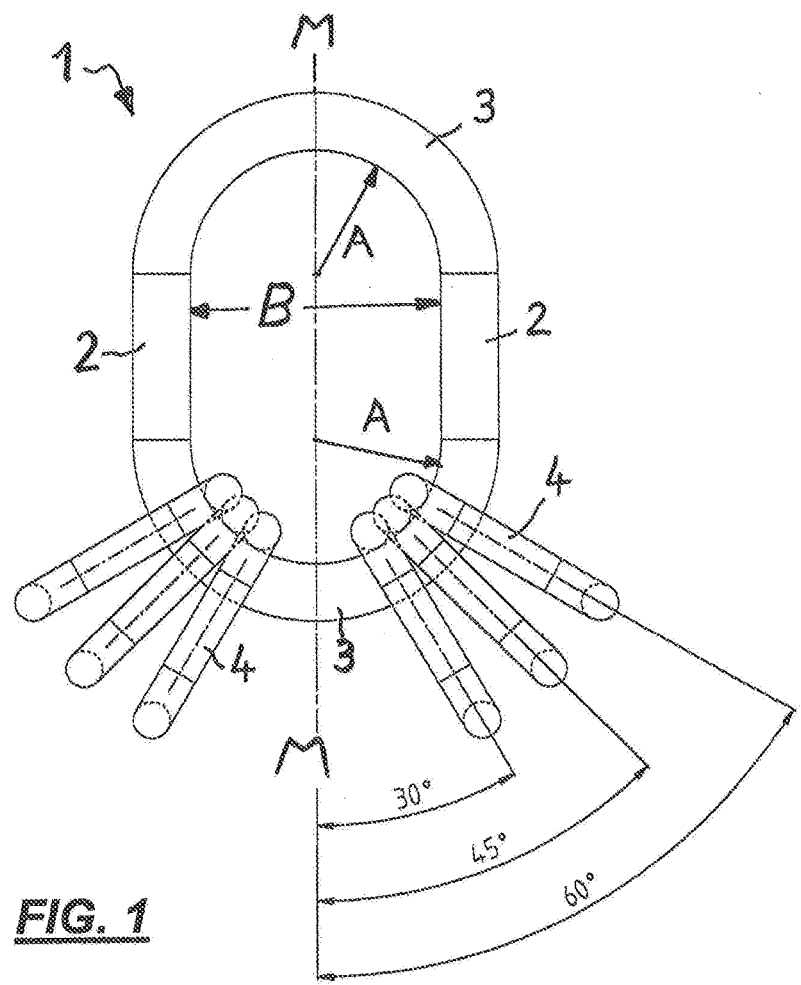
FIG. 1 shows a plan view of a suspension ring according to the prior art, having connecting legs rounded in the form of semicircles between the parallel rectilinear legs of the suspension ring, wherein a hooked-in B chain link of a chain lifting tackle is shown in three different slope angle positions on a connecting leg on each of the two sides of the longitudinal center line of the suspension ring.

FIG. 1 illustrates a suspension ring 1 according to the prior art, which has two lateral rectilinear and mutually parallel legs 2, which are connected to one another at each of the ends thereof by an arcuate connecting leg 3. In this known suspension ring 1, the connecting legs 3 are of semicircular design, wherein the radius of curvature A of each arcuate connecting leg 3, as viewed at the internal opening of the suspension ring 1, corresponds to half the internal width B between the two parallel rectilinear legs 2, with the result that: A=B/2.

As FIG. 1 shows, the configuration of the suspension ring 1 is symmetrical with the longitudinal center line M-M thereof.

If the connecting leg 3 is considered, on which, on each of the two sides of the longitudinal center line M-M, a respective B link of a connected chain strand (not shown in the figure) is illustrated in three different slope angle positions, namely respectively at 30°, 45° and 60°, then this connecting leg 3 of the suspension ring 1, to which a chain strand or a plurality of chain strands is/are connected, may be referred to here (and below) as the "lower connecting leg", since it always points downward in the operating state, while the second connecting leg 3, on which a crane hook engages, is always oriented upward.

The illustration in FIG. 1 shows that, in the case of this suspension ring 1 according to the prior art having the semicircular connecting legs 3, each connected chain strand (illustrated in FIG. 1 with its last B link hooked into the suspension ring 1) positions itself automatically in accordance with the respective slope angle in the semicircular rounded portion of the lower connecting leg 3. In this case, it adopts a different position on the lower connecting leg 3 at each slope angle, for which reason it is fundamentally difficult for a user to determine the slope angle involved from a slope angle which a B link 4 has adopted on the lower connecting leg 3 with an accuracy sufficient to determine the respective slope angle range precisely or with some degree of precision and with a high degree of certainty and hence to correctly estimate the load bearing capacity of the lifting tackle.

Figure 2:
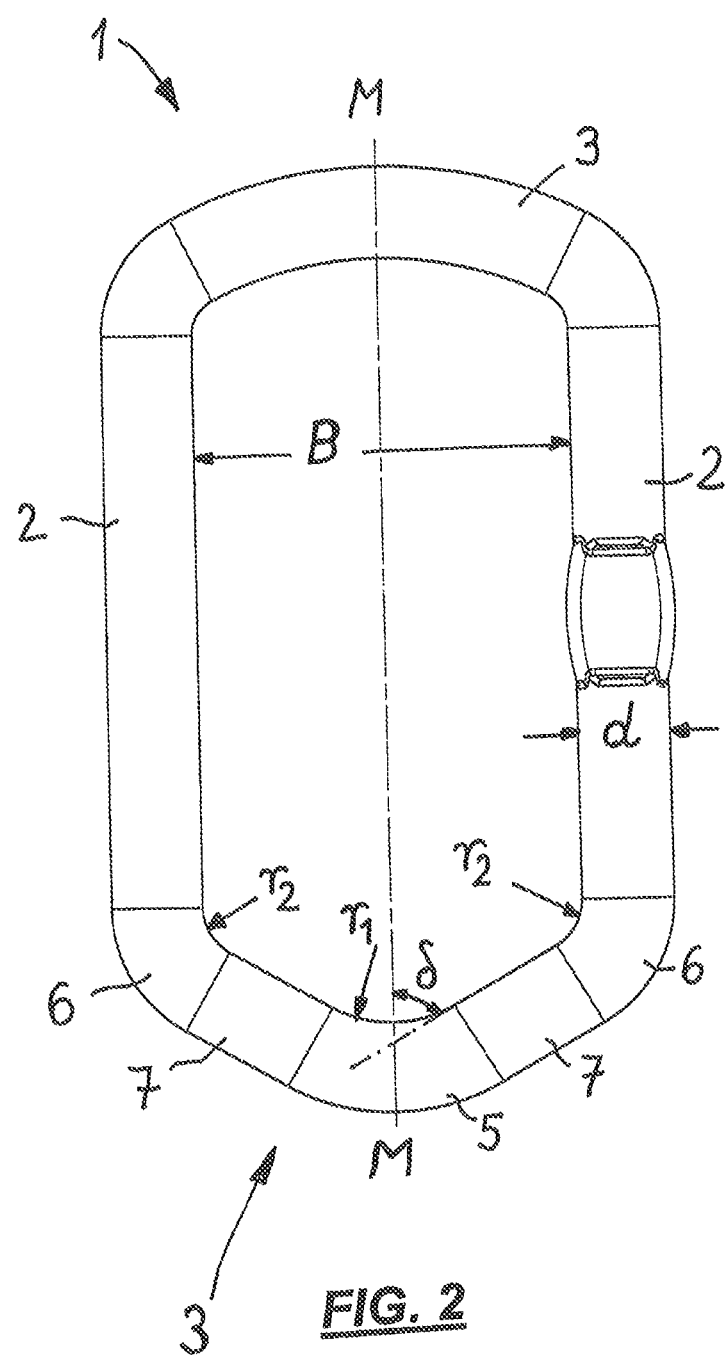
FIG. 2 shows a plan view of a suspension ring according to the invention.

The illustration in FIG. 2 then shows the plan view of a suspension ring according to the invention, which likewise has the two rectilinear and mutually parallel lateral legs 2, which are each connected to one another at their ends by a respective connecting leg 3. However, the lower connecting leg 3 is no longer of semicircular design, as in the suspension ring 1 from FIG. 1, but is in each case rounded in the form of a circular segment in the central region 5 of its extent and in both lateral regions 6 of its transitions into each of the two rectilinear legs 2, wherein the rounded central region 5 is in each case connected via a rectilinear intermediate region 7 of the lower connecting leg 3 to the transitional regions 6, likewise of rounded design, on the rectilinear legs 2.

As regards the size of the radii $r_1$ and $r_2$, which determine the rounding, in each case in the form of a circular segment, of regions 5 and 6, respectively, it is the case here that they are in each case less than half the internal width B of the suspension ring 1 between the two rectilinear legs 2 but greater than half the diameter d of a leg 2 (or also of the connecting leg 3), i.e. $r_1$, $r_2$<B/2 and $r_1$, $r_2$>d/2. The aim is to make the radii so small so that the rectilinear intermediate regions are as long as possible or achieve readily visible separation between the two angular ranges. On the other hand, the radii must not be too small in order to avoid notching effects.

Figure 3:
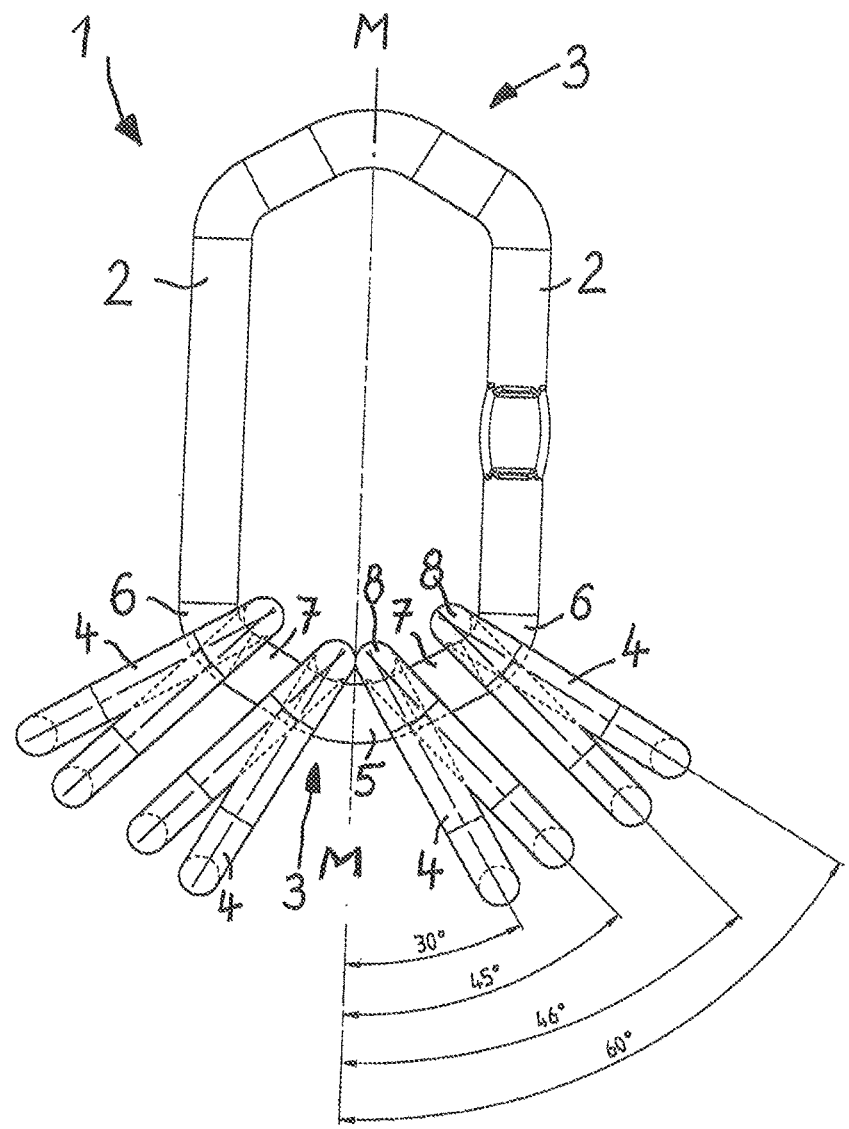
FIG. 3 shows a plan view of a suspension ring according to the invention, on the lower connecting leg of which, once again on both sides of the longitudinal center line in each case, a hooked-in B chain link of a chain lifting tackle is shown positioned in two positions, wherein it is shown in two angular positions in each of said positions.

FIG. 3 shows the suspension ring 1 according to FIG. 2, wherein here a B link 4 of a chain lifting tackle is attached to the lower connecting leg 3. In this case, this B link 4 on the lower connecting leg 3 is depicted in two positions on each side of the longitudinal center line M-M, and in two orientations in each position, namely in a position with the slope angles 30° and 45° and in another, outer position with a slope angle of 46° and a slope angle of 60°. These positions are depicted on both sides of the longitudinal center line M-M.

When the link 4 and the chain strand (not shown) hanging on said link enclose a slope angle of 30° with the vertical longitudinal center line M-M, the link 4 rests by means of a leg 8 in the central region 5 in the form of a circular segment of the lower connecting leg 3, on the inside of the lower connecting leg 3, namely in the 30° orientation, as can be seen from FIG. 3.

At a slope angle of 45°, an orientation of the chain link 4 as illustrated in FIG. 3, with the 45° indication, is obtained, wherein the leg 8 of the link 4, said leg being supported on the connecting leg 3, remains in the same position as when it adopts the 30° slope angle.

However, if the slope angle of the chain link 4 becomes larger than 45°, for instance 46° (or more), this has the effect that the supporting leg 8 of the link 4 no longer remains in the position in which it is depicted in the case of the angular range 30° to 45° in FIG. 3; instead, the supporting leg 8 of the link 4 then moves along the rectilinear intermediate segment 7 of the connecting leg 3 up to the transitional region 6, rounded in the form of a circular segment, of the lower connecting leg 3 to the rectilinear leg 2, located there, of the suspension ring, said leg 2 extending vertically upward. In the rounded portion of the transitional region 6 in the form of a circular segment formed there, the supporting leg 8 of the link 4 then once again adopts a stationary position, as is likewise graphically depicted in FIG. 3.

The angle of incidence δ of the rectilinear intermediate segment 7 of the lower connecting leg 3, which is at an angle in a range of from 50° to 75° to the longitudinal center line M-M of the suspension ring 1, ensures that, at a slope angle of more than 45°, the supporting leg 8 of the link 4 no longer remains in the position it has hitherto adopted but slides along the rectilinear intermediate segment 7, overcoming the friction on the lower connecting leg 3, until it adopts the position indicated for the angular range 46° to 60° in FIG. 3. The adoption of an intermediate position on the rectilinear intermediate segment 7 in a position such as that of the central position of the orientations illustrated in FIG. 1 (at a 45° slope angle) is not possible here because the supporting leg 8 of the chain link 4 (which generally consists of the same material as the suspension ring 8) slides along the entire rectilinear intermediate segment 7 and does not stop.

What is claimed is:

1. A suspension ring for multistrand lifting tackle, comprising:
   two parallel rectilinear legs, which are connected to one another at respective ends thereof by arcuate connecting legs that include a lower connecting leg and an upper connecting leg, wherein the lower connecting leg is formed symmetrically with respect to a longitudinal center line of the suspension ring, the lower connecting leg includes rectilinear intermediate segments, a central region having a curved segment, and two transitional regions, each transitional region having a curved segment, and the lower connecting leg merges into each of the two parallel rectilinear legs at the two transitional regions,
   wherein radii of the curved segments of the central and two transitional regions, on the inside of the suspension ring, are less than half of an internal width of the suspension ring, but are greater than half of a diameter of each of the two parallel rectilinear legs, and each end of the curved segment of the central region is connected to a circular segment of a transitional region via a rectilinear intermediate segment, and each circular segment of a transitional region is connected to an adjacent rectilinear leg, each intermediate segment forming an angle in a range of 50° to 75° with respect to the longitudinal center line of the suspension ring.

2. The suspension ring as claimed in claim 1, wherein a radius of the curved segment of the central region of the lower connecting leg is 2.5 times greater than half of the diameter of each of the two parallel rectilinear legs.

3. The suspension ring as claimed in claim 1, wherein radii of the curved segments of the central region and the transitional regions are equal.

4. The suspension ring as claimed in claim 1, wherein the curved segments of the lower connecting leg each merge tangentially into an adjoining rectilinear intermediate segment.

5. The suspension ring as claimed in claim 1, wherein each rectilinear intermediate segment is at an angle of 60° with respect to the longitudinal center line of the suspension ring.

6. The suspension ring as claimed in claim 1, wherein the arcuate lower connecting leg is additionally chamfered over its entire length.

* * * * *